C. C. SCHWANER.
Level.

No. 159,359.   Patented Feb. 2, 1875.

WITNESSES:
E. Wolff
A. F. Terry

INVENTOR:
Christian C. Schwaner
BY
ATTORNEYS.

UNITED STATES PATENT OFFICE.

CHRISTIAN C. SCHWANER, OF WINTERSET, IOWA.

IMPROVEMENT IN LEVELS.

Specification forming part of Letters Patent No. 159,359, dated February 2, 1875; application filed December 12, 1874.

*To all whom it may concern:*

Figure 1:
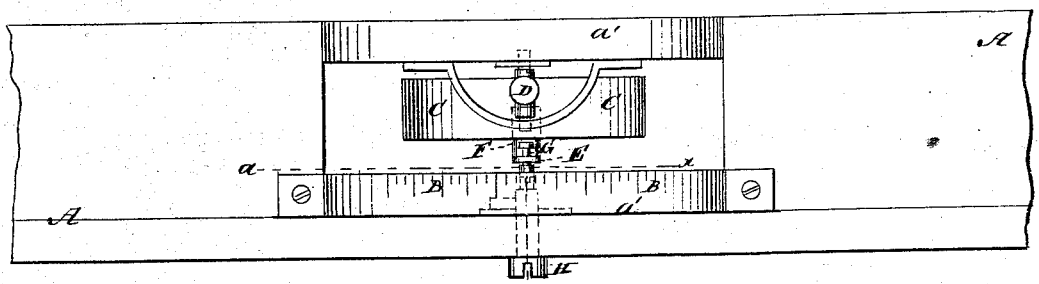
Figure 2:
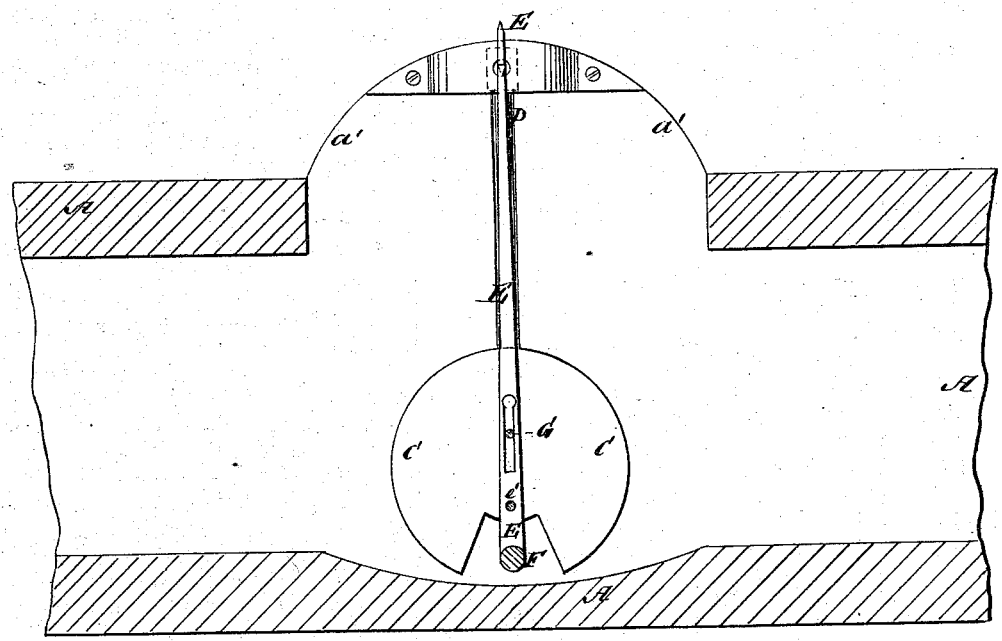
Figure 3:
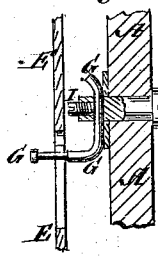

Be it known that I, CHRISTIAN C. SCHWANER, of Winterset, in the county of Madison and State of Iowa, have invented a new and useful Improvement in Plumb and Level, of which the following is a specification:

Figure 1 is a top view of my improved instrument adjusted for use as a level. Fig. 2 is a vertical longitudinal section of the same, taken through the line $x\,x$, Fig. 1. Fig. 3 is a detail view of the fulcrum-pin and a part of the pointer.

Similar letters of reference indicate corresponding parts.

The invention will first be fully described, and then pointed out in the claim.

A represents the case of the instrument, which is made of any desired or convenient length, breadth, and height. The case A is made hollow, and with a slot in the middle part of its upper edge. The case A is made with semicircular projections $a'$ upon its upper edge, in front and rear of the slot in its said upper edge. Upon the curved edge of the front projection $a'$ is formed a scale, B, of division-marks, as shown in Fig. 1; or a dial may be placed behind the pointer. C is a pendulum, the rod D of which passes up through the slot in the upper edge of the case A, and has a knife-edge cross-head attached to its upper end, which works in bearings attached to the rear projection $a'$. E is a pointer, which is pivoted near its lower end to the lower part of the pendulum C, as shown at $e'$, Fig. 2. The pointer E may be used with or without a weight, F, attached to its lower end. When the weight F is used the lower edge of the pendulum C should be notched, to furnish space for said weight. The pointer E is slotted longitudinally a little above the pivot $e'$, to receive the pin G, which serves as a fulcrum to said pointer; or the pointer can be made round, and passed through a slot in the pin G. The pin G is bent at right angles, and is passed through a hole in the inner part of the pin H, which pin passes through the front wall of the case A, and has a slot it its out end, so that it may be readily turned with a screw-driver to adjust the pin G; or the pin H can be made with a figured thumb-nut, working against a figured face-plate, to set to different angles. The pin G is secured adjustably in the hole in the inner part of the pin H by a set-screw, I, which passes in through the forward end of the pin H, and its forward end rests against the side of the said pin G. The upper end of the pointer E passes up to the scale B, so as to indicate the angle of inclination of the object to which the instrument may be applied.

When the instrument is to be used as a plumb, the pendulum C D and pointer E are arranged longitudinally with the case A, and the point of the index is seen through a curved slot in the forward side of the case A, the construction of the parts being exactly the same as hereinbefore described.

Having thus described my invention, I claim as new, and desire to secure by Letters Patent—

The combination, with pendulum C and longitudinally-slotted pointer E, of the pins G H and set-screw I, as and for the purpose specified.

CHRISTIAN C. SCHWANER.

Witnesses:
    NATHAN FOSTER,
    GEO. W. HAMPTON.